(12) United States Patent
Yada (10) Patent No.: US 11,449,284 B2
(45) Date of Patent: Sep. 20, 2022

(54) INFORMATION PROCESSING DEVICE, INFORMATION PROCESSING METHOD, AND NON-TRANSITORY COMPUTER-READABLE RECORDING MEDIUM THEREFOR CAPABLE OF MANAGING AMOUNT OF CONSUMABLES OF A MANAGED DEVICE

(71) Applicant: BROTHER KOGYO KABUSHIKI KAISHA, Nagoya (JP)

(72) Inventor: Yuki Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/196,185

(22) Filed: Mar. 9, 2021

(65) Prior Publication Data
US 2021/0303233 A1 Sep. 30, 2021

(30) Foreign Application Priority Data

Mar. 31, 2020 (JP) .............................. JP2020-062328

(51) Int. Cl.
*G06F 3/12* (2006.01)
(52) U.S. Cl.
CPC .......... *G06F 3/1219* (2013.01); *G06F 3/1204* (2013.01); *G06F 3/1221* (2013.01); *G06F 3/1235* (2013.01)
(58) Field of Classification Search
CPC .... G06F 3/1219; G06F 3/1204; G06F 3/1221; G06F 3/1235

USPC ....................................................... 358/1.15
See application file for complete search history.

(56) References Cited

U.S. PATENT DOCUMENTS

| | | | | |
|---|---|---|---|---|
| 4,839,829 A | * | 6/1989 | Freedman | G06F 40/12 358/1.15 |
| 2016/0292629 A1 | * | 10/2016 | Matsuda | G06Q 10/087 |
| 2018/0167520 A1 | * | 6/2018 | Jimbo | H04N 1/00092 |
| 2020/0201228 A1 | * | 6/2020 | Kawaguchi | G03G 15/556 |

FOREIGN PATENT DOCUMENTS

JP 2000-181641 A 6/2000

* cited by examiner

*Primary Examiner* — Allen H Nguyen
(74) *Attorney, Agent, or Firm* — Scully, Scott, Murphy & Presser, PC (57) ABSTRACT

An information processing device according to aspects of the present disclosures is configured to obtain remaining amount information indicating a remaining amount of consumables from a managed device through the communication device, obtain forecast information indicating an estimated consumed amount of the consumables in a particular period from an information source in which the forecast information is registered, determine whether a remaining amount of the consumables becomes less than a particular determination criteria value within the particular period based on the remaining amount information and the forecast information, and display a management screen on the display, the management screen being a screen displaying a status object indicating a status of the consumables, of which the remaining amount is determined to become lower than the particular determination criteria value, in association with the managed device.

18 Claims, 10 Drawing Sheets

FIG. 1

| Device Status | Model Name | User Name | NodeName | IP Address | Serial Number | All Option Status | Option1 | Option1 Status | Option2 | Option2 Status | Option3 | Option3 Status | ... |
|---|---|---|---|---|---|---|---|---|---|---|---|---|---|
| Sleep | PT | User1 | PT1 | 192.168.1.10 | XXXXX1 | Ready | Bar Code Reader 1 | Ready | Bluetooth Unit 2 | Ready | Operation Panel | Ready | |
| Sleep | PT | User1 | PT2 | 192.168.1.11 | XXXXX2 | Ready | Rechargeable Battery 1 | Ready | | | | | |
| Sleep | PT | User2 | PT3 | 192.168.1.12 | XXXXX3 | Attention | Bar Code Reader 2 | Ready | Bluetooth Unit 1 | Attention | | | |
| Sleep | QL | User3 | QL1 | 192.168.1.13 | XXXXX4 | Attention | Rechargeable Battery 2 | Attention | | | | | |
| Sleep | QL | User4 | QL2 | 192.168.1.14 | XXXXX5 | Error | Rechargeable Battery 3 | Ready | Wireless LAN Unit 1 | Error | | | |
| Sleep | MFP | | MFP | 192.168.1.15 | XXXXX6 | | | | | | | | |

FIG. 2A

| Option Name | Option Model Number | Status | Remaining Amount | Priority | User Feedback |
|---|---|---|---|---|---|
| Bar Code Reader 1 | BCR01 | Ready | | 3 | |
| Bar Code Reader 2 | BCR01 | Ready | | 3 | PT3 |
| Rechargeable Battery 1 | BAT01 | Ready | Middle | 1 | |
| Rechargeable Battery 2 | BAT02 | Attention | Low | 1 | |
| Rechargeable Battery 3 | BAT02 | Ready | Empty | 1 | |
| Rechargeable Battery 4 | BAT02 | Ready | Full | 1 | |
| Bluetooth Unit 1 | BT01 | Attention | | 2 | |
| Bluetooth Unit 2 | BT01 | Ready | | 2 | |
| Wireless LAN Unit 1 | WLAN01 | Error | | 3 | |
| Wireless LAN Unit 2 | WLAN01 | Ready | | 3 | |
| Operation Panel | PA01 | Ready | | 3 | |

FIG. 2B

| Model Name | Option Model Number | | | | Mobile Product |
|---|---|---|---|---|---|
| PT | BCR01 | BAT01 | BT01 | PA01 | Yes |
| QL | BAT02 | WLAN01 | BCR01 | | Yes |
| MFP | | | | | No |

FIG. 2C

| Business | Option1 | Necessary Remaining Amount |
|---|---|---|
| A | Rechargeable Battery | 80% |
| B | Rechargeable Battery | 80% |
| C | Roll Sheet A | 100m |
| D | Roll Sheet B | 500m |
| E | Cut Sheet | 1000 Sheets |

| | User Name | Node Name | Remaining Amount of Consumables | Stock of Consumables | |
|---|---|---|---|---|---|
| ☐ | User1 | PT1 | | Rechargeable Battery A | ...... |
| ☐ | User1 | PT2 | | Rechargeable Battery B | |
| ☐ | User2 | PT3 | 10 m | Roll Sheet A | |
| ☐ | User3 | QL1 | 300 Sheets | Roll Sheet B | |
| ☐ | User4 | QL2 | 30 Sheets | Roll Sheet B | |
| ☐ | ...... | MFP | ...... | ...... | |

| User Name | Node Name | Remaining Amount of 1st Consumables 541 | Remaining Amount of 2nd Consumables 543 | ...... |
|---|---|---|---|---|
| ☐ User1 | PT1 | 🔋 | 10 m | |
| ☐ User1 | PT2 | ⚡ | | |
| ☐ User2 | PT3 | 10 m | | |
| ☐ User3 | QL1 | 300 Sheets | | |
| ☐ User4 | QL2 | 30 Sheets | 100 Sheets | |
| ☐ ...... | MFP | ≡ | ...... | |

INFORMATION PROCESSING DEVICE, INFORMATION PROCESSING METHOD, AND NON-TRANSITORY COMPUTER-READABLE RECORDING MEDIUM THEREFOR CAPABLE OF MANAGING AMOUNT OF CONSUMABLES OF A MANAGED DEVICE

CROSS-REFERENCE TO RELATED APPLICATIONS

This application claims priority under 35 U.S.C. § 119 from Japanese Patent Application No. 2020-062328 filed on Mar. 31, 2020. The entire subject matter of the application is incorporated herein by reference.

BACKGROUND

Technical Field

The present disclosures relate to an information processing device, an information processing method and a non-transitory computer-readable recording medium storing computer-executable instructions realizing a management program for the information processing device.

Related Art

In a field of an information processing device capable of communicating with a plurality of printers via a network, there has been proposed a technique to display a list of a plurality of pieces of information on the plurality of printers, respectively. In such a conventional technique, a presence or an absence of a sorter, a presence or an absence of a stapler, and a presence or an absence of a duplex printing function are listed as options for each printer.

SUMMARY

However, according to the above-mentioned conventional technique, only the presence or absence of the stapler is displayed as described above. Therefore, a user cannot know, for example, whether the remaining amount (e.g., number) of needles of the stapler is sufficient for an estimated consumption amount.

According to an aspect of the present disclosure, it is desirable to provide a management program, an information processing device, and an information processing method enabling a user to recognize whether there remains a sufficient amount of consumables installed in a managed device.

According to aspects of the present disclosures, there is provided a non-transitory computer-readable recording medium for an information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device, the recording medium containing computer-executable instructions which cause, when executed by the processor, the information processing device to perform managing the consumables. The managing including obtaining remaining amount information indicating a remaining amount of the consumables from the at least one managed device through the communication device, obtaining forecast information indicating an estimated consumed amount of the consumables in a particular period from an information source in which the forecast information is registered, determining whether a remaining amount of the consumables becomes less than a particular determination criteria value within the particular period based on the remaining amount information and the forecast information, and displaying a management screen on the display, the management screen being a screen displaying a status object indicating a status of the consumables, of which the remaining amount is determined to become lower than the particular determination criteria value in the determining, in association with the at least one managed device.

According to aspects of the present disclosures, there is provided an information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device. The information processing device is configured to perform managing the consumables. The managing including obtaining remaining amount information indicating a remaining amount of the consumables from the at least one managed device through the communication device, obtaining forecast information indicating an estimated consumed amount of the consumables in a particular period from an information source in which the forecast information is registered, determining whether a remaining amount of the consumables becomes less than a particular determination criteria value within the particular period based on the remaining amount information and the forecast information, and displaying a management screen on the display, the management screen being a screen displaying a status object indicating a status of the consumables, of which the remaining amount is determined to become lower than the particular determination criteria value in the determining, in association with the at least one managed device.

According to aspects of the present disclosures, there is provided an information processing method of controlling an information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device. The information processing method including managing the consumables, the managing including obtaining remaining amount information indicating a remaining amount of the consumables from the at least one managed device through the communication device, obtaining forecast information indicating an estimated consumed amount of the consumables in a particular period from an information source in which the forecast information is registered, determining whether a remaining amount of the consumables becomes less than a particular determination criteria value within the particular period based on the remaining amount information and the forecast information, and displaying a management screen on the display, the management screen being a screen displaying a status object indicating a status of the consumables, of which the remaining amount is determined to become lower than the particular determination criteria value, in association with the at least one managed device.

DETAILED DESCRIPTION OF THE EMBODIMENTS

Hereinafter, an information processing device, an information processing method, and a non-transitory computer-readable recording medium containing instructions realizing a management program will be described with reference to illustrative embodiments.

Configuration of the Information Processing System

Figure 1:
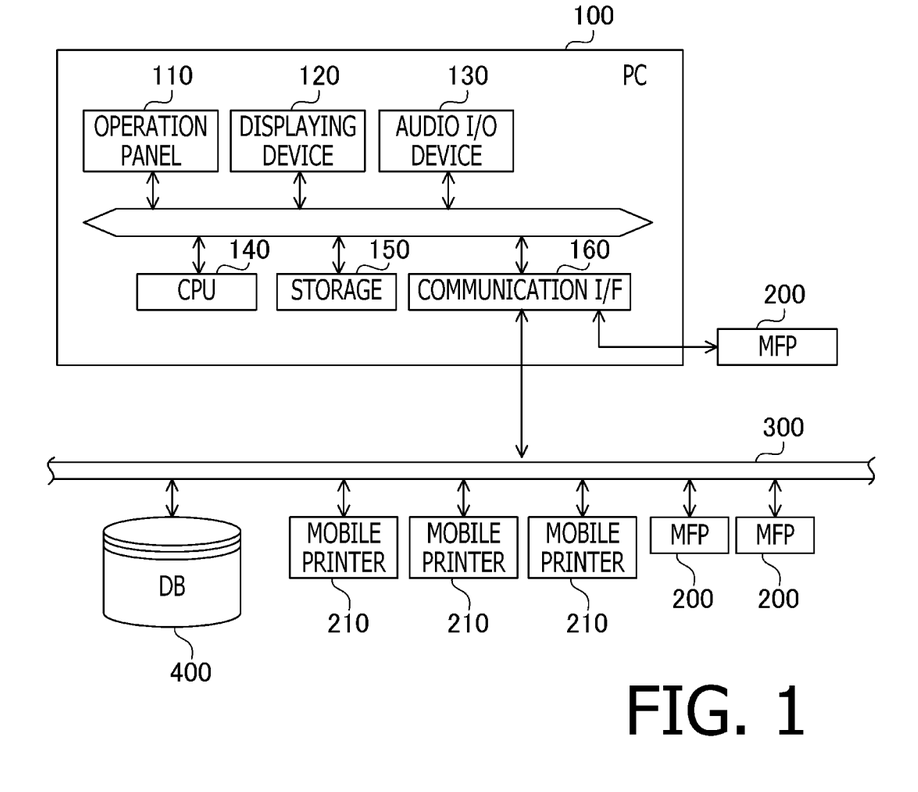
FIG. 1 shows a functional configuration of an information processing system.

FIG. 1 shows a configuration of an information processing system 1 that includes a personal computer (PC) 100, a multifunction peripheral (MFP) 200, and a mobile printer 210. The PC 100 is a device configured to execute processes based on a management program according to one embodiment of the present disclosures (hereinafter, the PC 100 will also be referred to as a management device). The MFP 200 and the mobile printer 210 are communicatively connected to the PC 100. The MFP 200 and the mobile printer 210 are devices managed by the PC 100, which serves as the management device (hereinafter, such a device managed by the management device will also be referred to as a managed device).

The PC 100 has an operation panel 110, a display 120, an audio I/O device 130, a CPU 140, a storage 150, and a communication I/F 160. It is noted that "I/O" is an abbreviation for Input/Output, "CPU" is an abbreviation for Central Processing Unit, and "I/F" is an abbreviation for Interface.

The operation panel 110 typically includes a keyboard and a mouse. The display 120 includes a display such as a liquid crystal display or an organic EL display, and a drive circuit to drive the display. As the display 120, a display configured to allow input using a touch panel system may be used. In such a case, the user can perform input operations by pressing (touching) the input buttons displayed on the screen. In this case, a transparent touch panel superimposed on the screen of the display functions as the operation panel 110.

The audio I/O device 130 includes a microphone, a speaker, and audio processing circuits. The CPU 140 is configured to execute various application programs (hereinafter abbreviated as "App") including the management program according to the present embodiment and firmware.

The storage 150 may include a ROM (Read Only Memory), a RAM (Random Access Memory), an HDD (Hard Disk Drive), an SSD (Solid State Drive), an optical disk drive, or the like. The ROM stores the firmware and various data. The RAM is used as a primary storage device where applications and data are temporarily stored when the CPU 140 executes various processes.

The storage 150 stores an OS (Operating System), the management program according to the present embodiment, and various other applications and data. The various applications can be downloaded from an external server (not shown) via the communication I/F 160. The applications can also be downloaded from the external device (not shown) via a USB (Universal Serial Bus) I/F provided to the PC 100.

The management program according to the present embodiment is an application configured to display and manage the status of the functions (e.g., a printer function, a scanner function, and a facsimile function, etc.) provided by the MFP 200 and the mobile printer 210 per each device.

The communication I/F 160 is a device having a function to connect the PC 100 to a communication network 300 and a function to connect external devices to the PC 100. Since the communication network 300 is assumed to be a wired or wireless LAN (Local Area Network) in this embodiment, the communication I/F 160 has a LAN I/F (Local Area Network Interface) or a WLAN I/F (Wireless LAN Interface). It should be noted that both the wired LAN and the wireless LAN could exist simultaneously, and in such a case, the communication I/F 160 includes both the LAN I/F and the WLAN I/F. The communication network 300 is not limited to the LAN, but may be of any other network type such as the Internet. The interface for directly connecting the external devices to the PC 100 includes the USB I/F and the Bluetooth® I/F. The multiple MFPs 200 and the mobile printer 210 can be connected to the communication network 300 in this embodiment.

The PC 100 is configured to access the database 400. In the following description, the database is abbreviated as the "DB." The DB 400 is a data storage area accessible via the communication network 300. The DB 400 is configured, for example, by a NAS (Network Attached Storage). The information registered in the DB 400 can be retrieved by various devices that can access the DB 400 via the communication network 300.

Figure 2A:
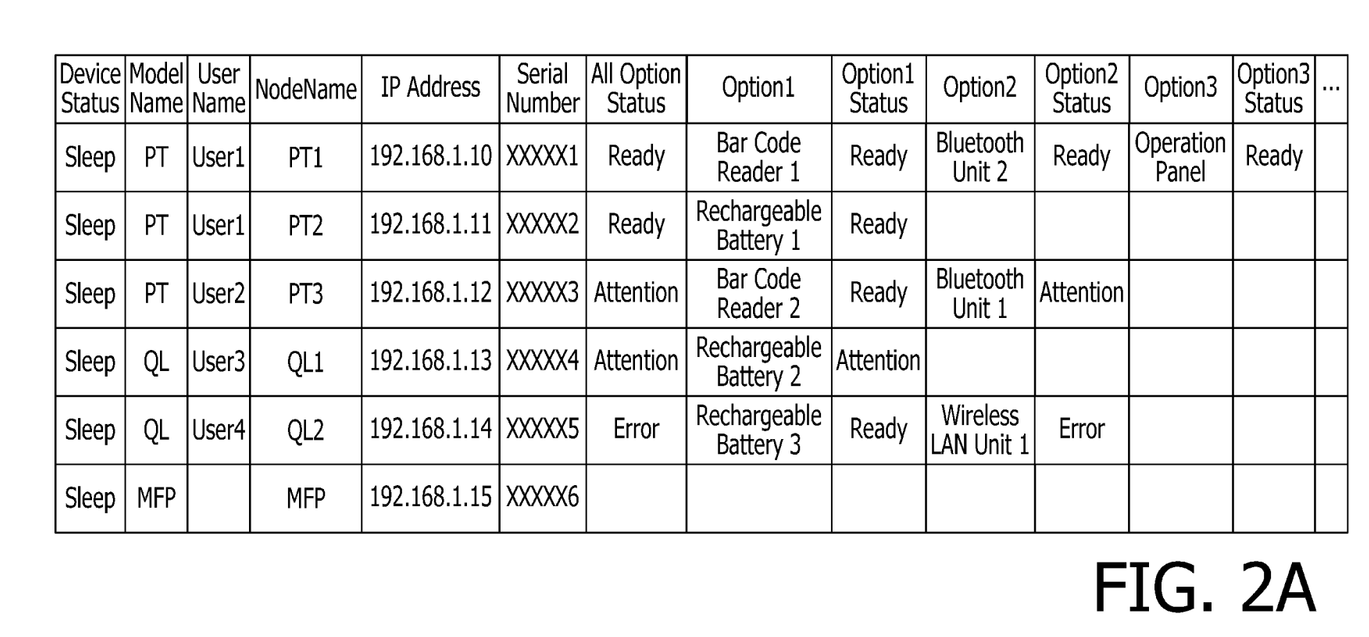
FIG. 2A shows an example of a device database.
Figure 2B:
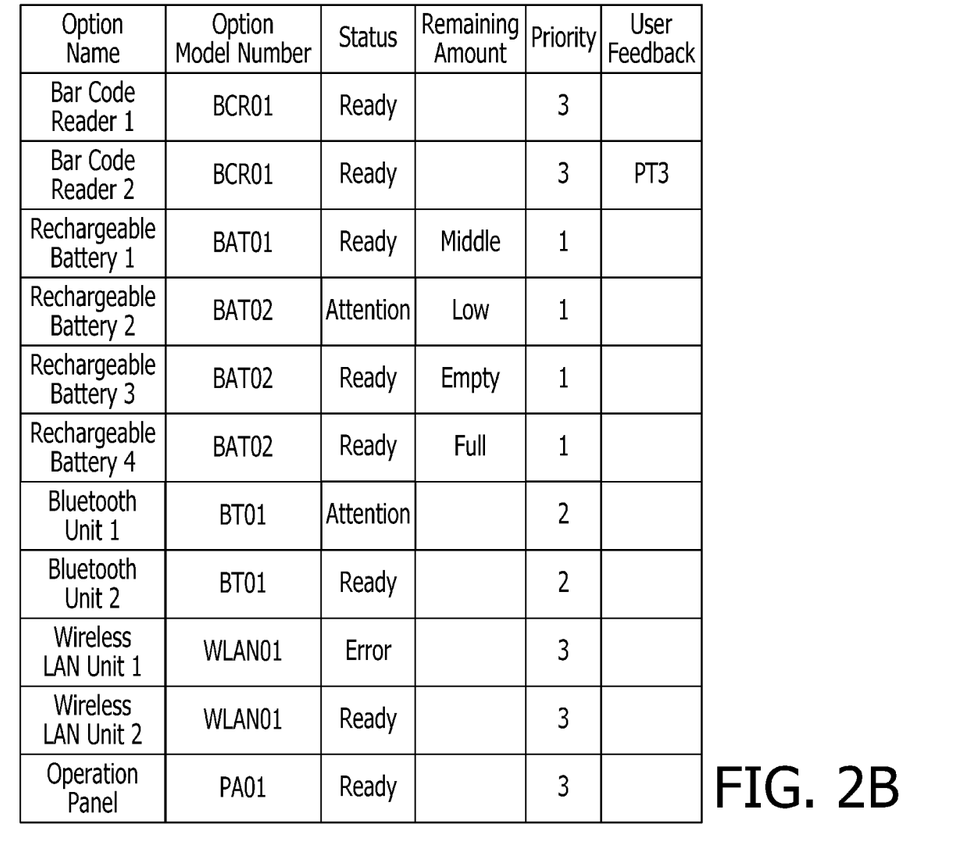
FIG. 2B shows an example of an optional product database.
Figure 2C:
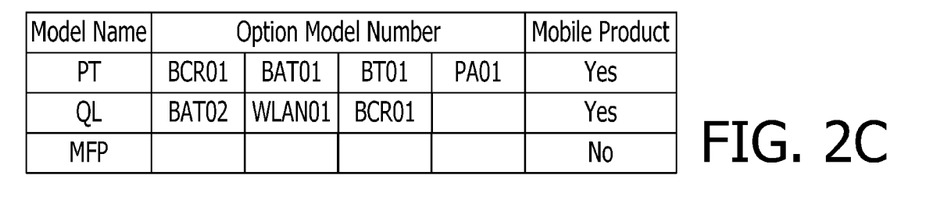
FIG. 2C shows an example of a model number based device support database.
Figure 2D:
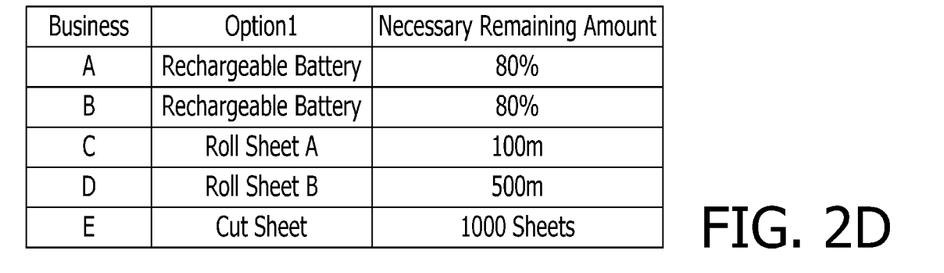
FIG. 2D shows an example of a work database.

The DB 400 includes the device DB shown in FIG. 2A, an optional product DB shown in FIG. 2B, a model number based device support DB shown in FIG. 2C, and a work DB shown in FIG. 2D. The above-mentioned DBs (hereinafter, referred to as a DB group) shown in FIGS. 2A to 2D are used in the processes described below.

Management Process

Figure 3:
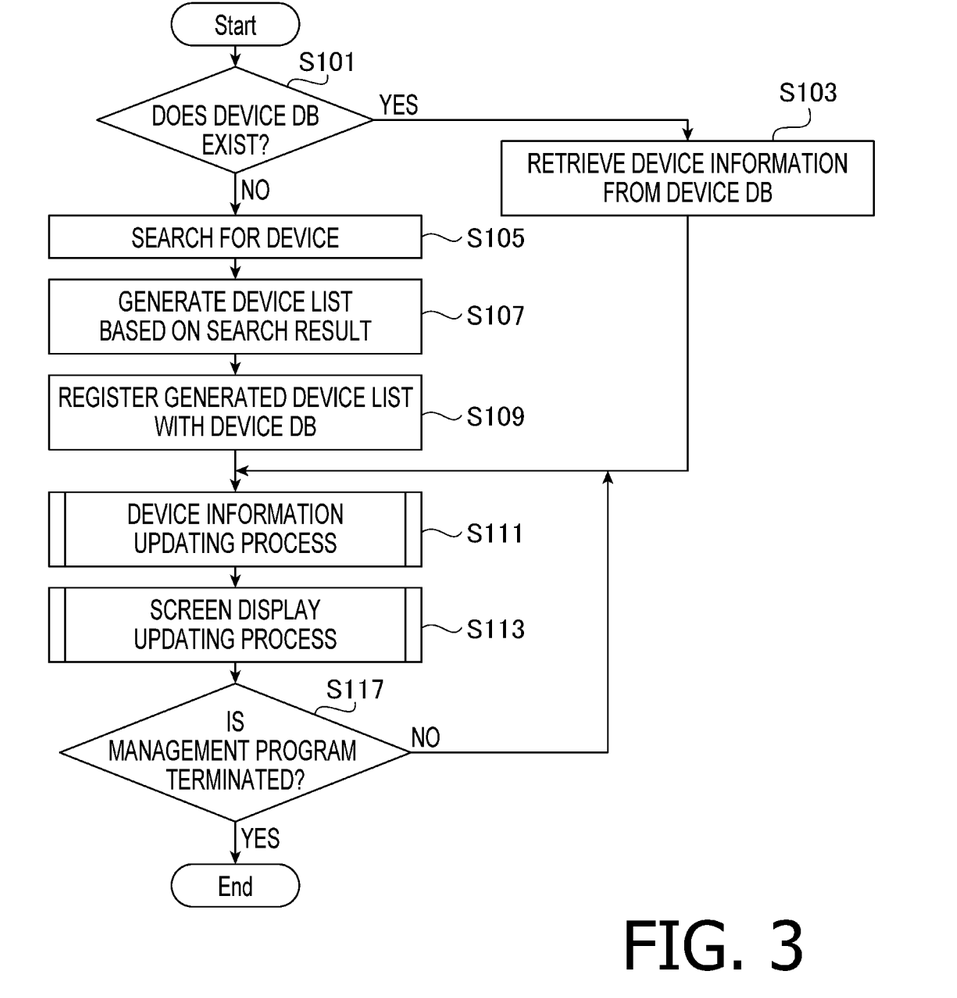
FIG. 3 shows a flowchart illustrating a management process.

Hereinafter, a management process performed in the PC 100 will be described referring to flowcharts shown in FIGS. 3-7. When the management process is started, as shown in FIG. 3, the PC 100 determines whether there exists the device DB (S101). The device DB is a database in which information on a plurality of items as shown in FIG. 2A is stored for each of managed devices. When it is determined that there exists the device DB (S101: YES), the PC 100 retrieves device information of the managed device from the device DB (S103). In S103, a list (hereinafter, referred to as a device list) of the managed devices under management of the management device (PC 100) is read out. The device information read out in S103 includes user information indicating a user of each managed device.

On the other hand, when it is determined that there is no device DB (S101: NO), the PC 100 searches for devices (S105), creates a device list based on the search results (S107), and registers the created device list to the device DB (S109). In other words, when the management process is executed for the first time or when the device DB does not exist for some reason, S105-S109 are executed to create a list of managed devices (i.e., the device list) under the management of the management device (PC 100). It is noted that, the device list created here includes user information indicating the user of each managed device. After execution of S109, the process proceeds to S111.

Figure 4:
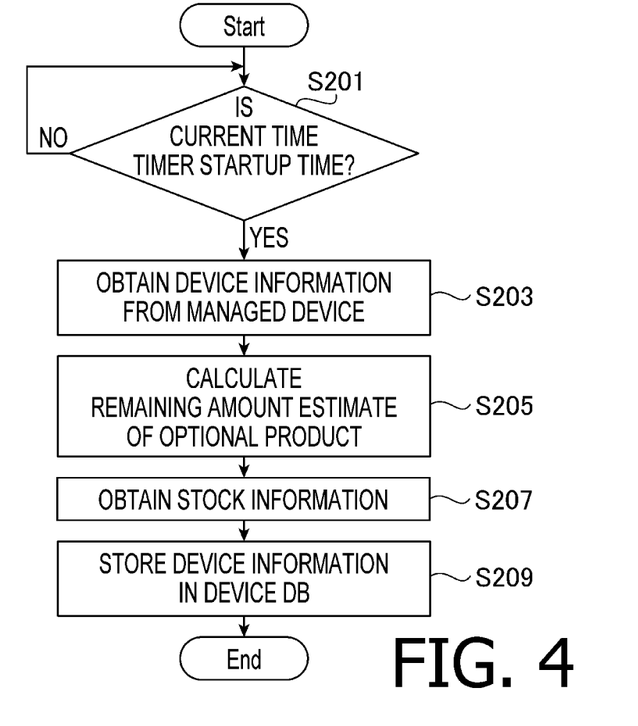
FIG. 4 shows a flowchart illustrating a device information updating process.

When the process proceeds from S103 or S109 to S111, the PC 100 executes a device information updating process (S111). Details of the device information updating process (S111) are shown in FIG. 4. Upon starting the device information updating process, as shown in FIG. 4, the PC 100 determines whether it is a timer startup time (S201). It is noted that the timer startup time is a time set to execute subsequent processing steps upon every elapse of a particular time period. In the present embodiment, for example, five minutes is set as the timer startup time. In this case, it is judged to be "YES" in S201 at every elapse of five minutes. When it is judged that it is not the timer startup time (S201: NO), the process returns to S201. Accordingly, the process remains in S201 until the timer startup time has elapsed.

When it is determined that a current time is the timer startup time (S201: YES), the PC 100 obtains the device information from the managed device (S203). In S203, basic information of the managed device (e.g., an IP address, a serial number, etc.), a status of the managed device (e.g., normal, warning error, abnormal error, etc.), and information on optional products installed in the managed device (e.g., an optional device name, and optional device model number, and optional device status, etc.) are obtained from each managed device.

In S205, the PC 100 calculates an estimate of the remaining amount of the optional items (e.g., rechargeable batteries, paper rolls, etc.) of which the remaining amount fluctuates. In S207, the PC 100 obtains stock information on the optional products (e.g., availability and amount of spare rechargeable batteries and paper rolls, etc.) from the optional product DB, which is accessible via the communication network 300. Then, the PC 100 stores the device information to the device DB (S209) and terminates the device information updating process shown in FIG. 4.

Figure 5:
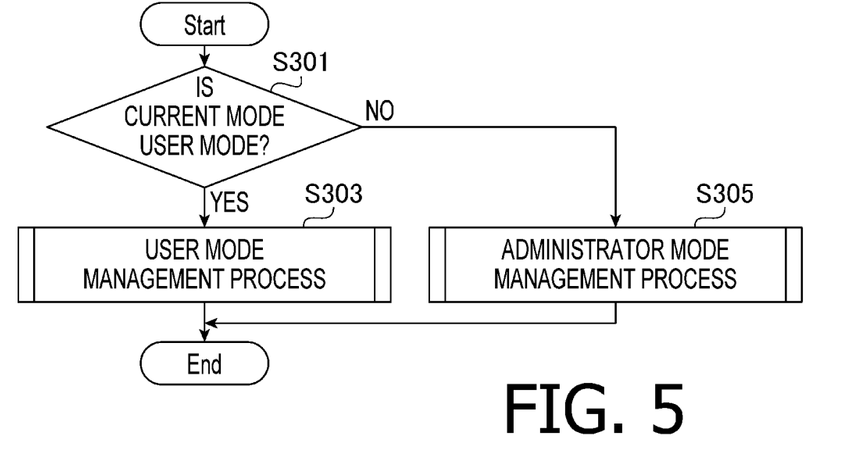
FIG. 5 shows a flowchart illustrating a screen display updating process.
Figure 8:
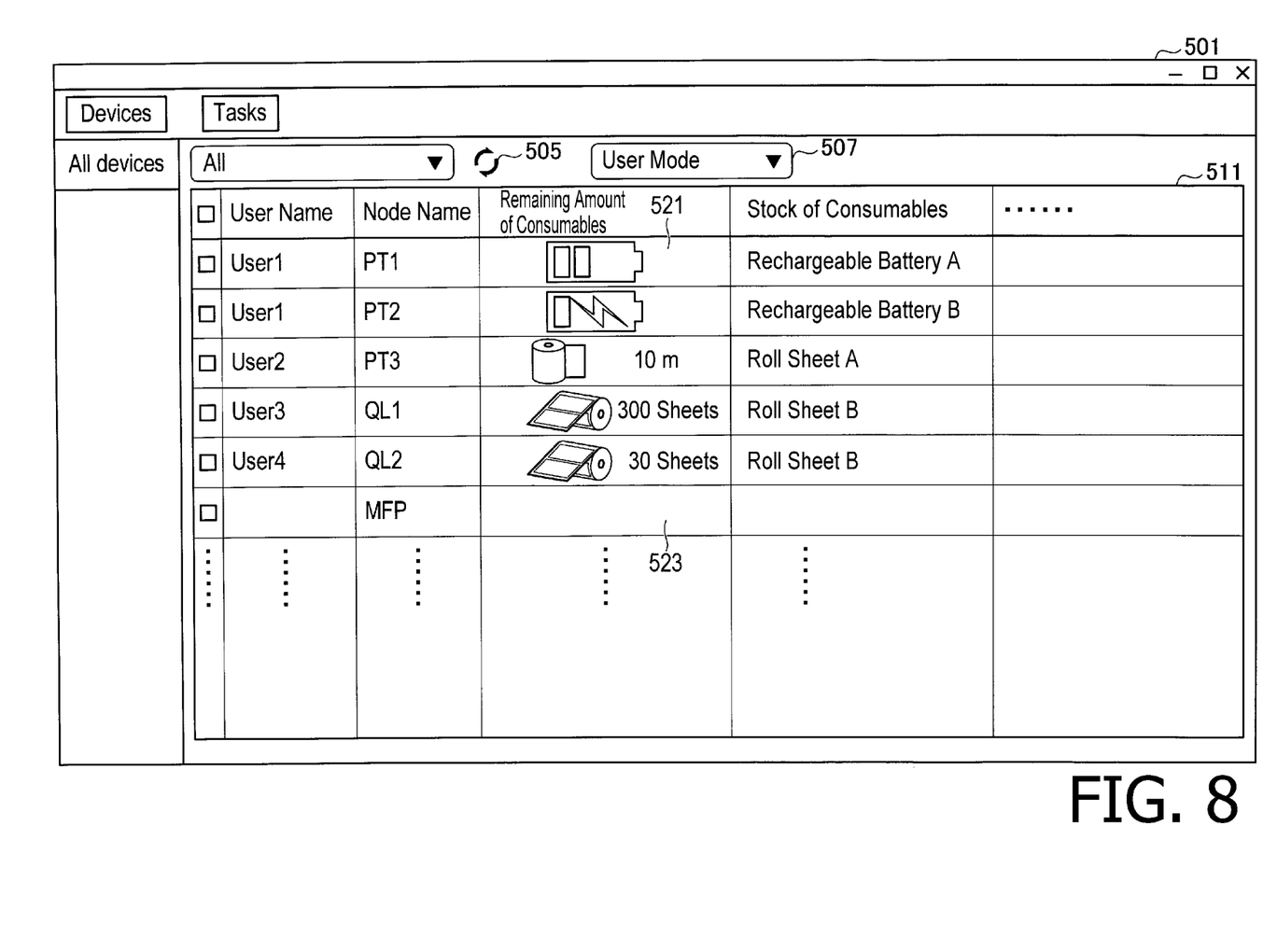
FIG. 8 shows an example of a first management screen.
Figure 9:
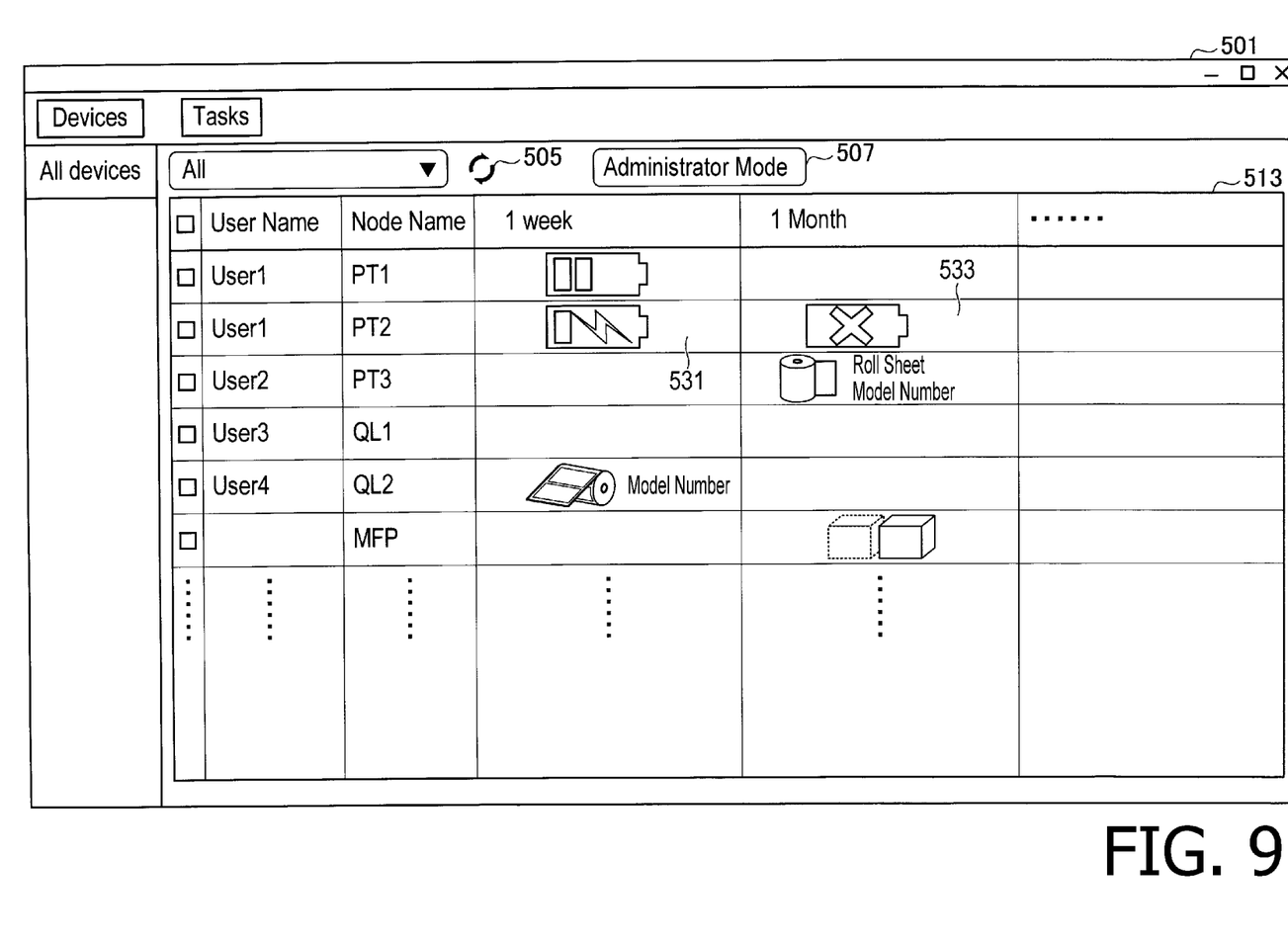
FIG. 9 shows an example of a second management screen.
Figure 10:
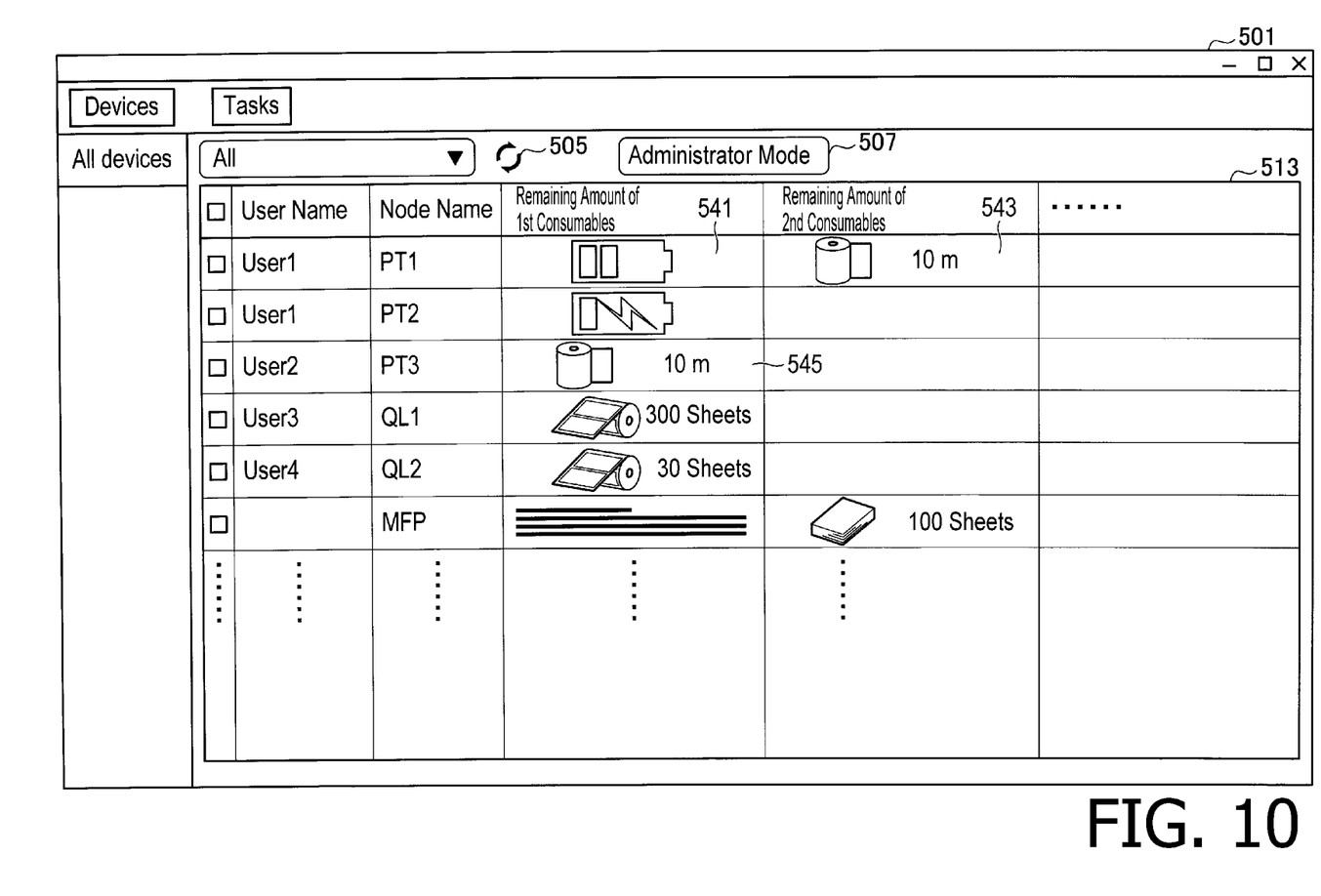
FIG. 10 shows an example of a third management screen.

After completing a device information updating process shown in FIG. 4, the process proceeds from S111 to S113 in FIG. 3 to execute the screen display updating process (S113). The details of the screen display updating process (S113) are shown in FIG. 5. Upon starting the screen display updating process, as shown in FIG. 5, the PC 100 determines whether the PC 100 is in a "User Mode" or not (S301). As will be described in detail later, when the management process is executed in the PC 100, a management screen 501 as shown in FIGS. 8-10 is displayed on the display 120 of the PC 100.

On the management screen 501, a plurality of display objects, including an information updating button 505 and a mode selection field 507, are arranged. When the user operation of pressing the information updating buttons 505 on the operation panel 110 is performed, the information on the management screen 501 is updated to the latest information. Further, by the user operation of the operation panel 110 to press the mode selection field 507, a display mode of the management screen 501 is switched to the selected one of a "User Mode (see FIG. 8)" or an "Administrator Mode (see FIGS. 9 and 10)."

In S301, it is determined whether or not the "User Mode" is selected in the mode selection field 507. When it is determined that the "User Mode" is selected (S301: YES), the PC 100 executes the user mode management process (S303). In the management screen 501, a user mode information table 511 is displayed as shown in FIG. 8.

The user mode information table 511 includes multiple display fields. The multiple display fields are arranged such that there are the same number of rows as the plurality of managed devices and the same number of columns as the plurality of display items for each managed device. FIG. 8 shows, as examples of the plurality of display items, "User Name," "Node Name," "Remaining Amount of Consumables" and "Stock of Consumables," but other display items may be further included.

Figure 6:
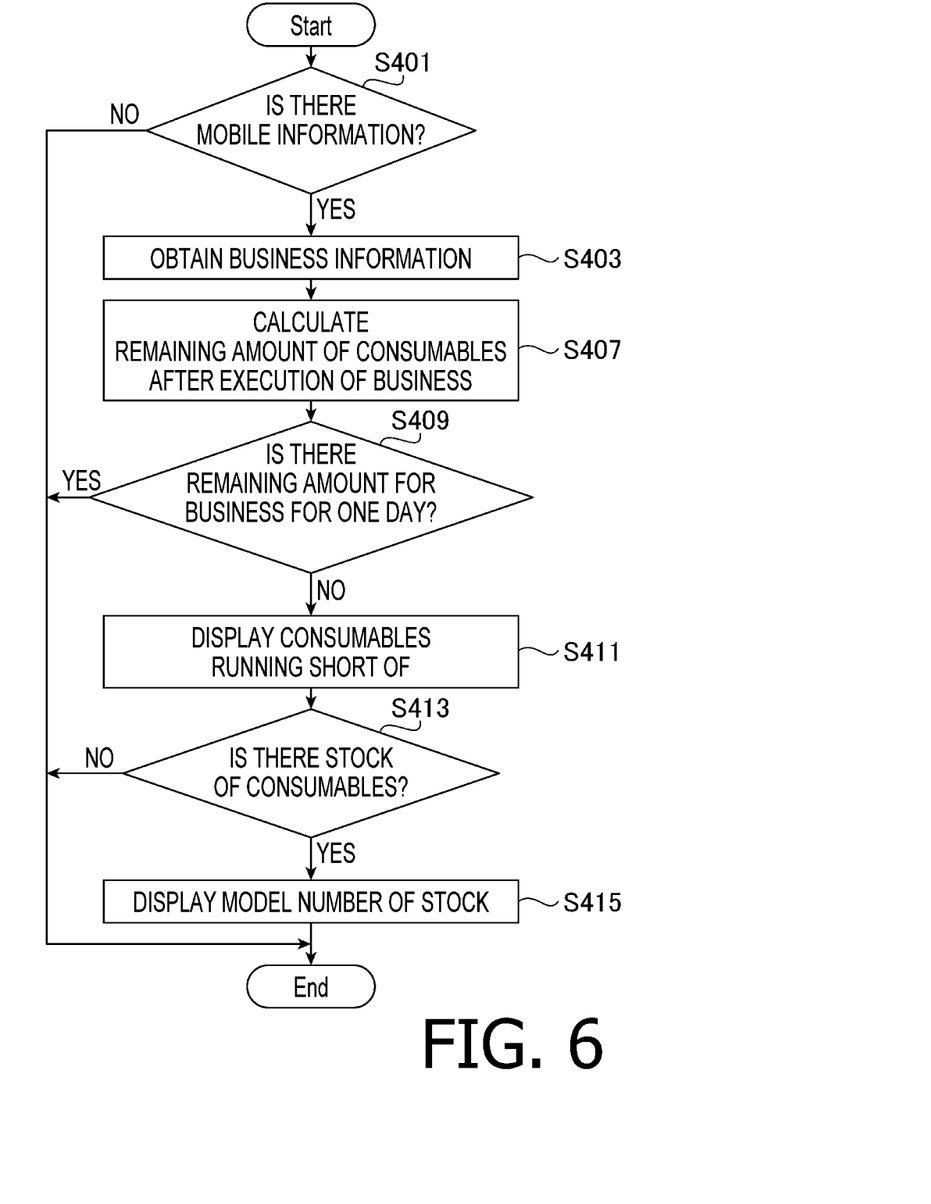
FIG. 6 shows a flowchart illustrating a user mode management process.

Details of the user mode management process (S303) are shown in FIG. 6. When the user mode management process is started, as shown in FIG. 6, the PC 100 determines whether there is mobile information (S401). In S401, the device DB illustrated in FIG. 2A is searched using the "Node Name" of each managed device as a key to identify the "Model Name" of each managed device. Then, using the identified "Model Name" as a key, the model number based device support DB shown in FIG. 2C is searched to determine whether each managed device is a mobile product or not. As a result of the determination, when no mobile product is included in the managed devices, it is determined that there is no mobile information (S401: NO), and in that case, the user mode management process shown in FIG. 6 is terminated.

On the other hand, when the mobile product is included in the managed devices, it is determined that there is mobile information (S401: YES), in which case the PC 100 obtains the work information (S403). The work information obtained in S403 includes type information corresponding to a type of consumables required for a day's work and forecast information corresponding to the expected consumption of consumables required for target work. In S403, such work information is obtained from information sources. The information sources include a DB in which the information has already been registered in advance, and an operation panel 110 in which the information can be input by the user operation. Any one of these multiple information sources may be used, or multiple sources may be used in combination.

As one concrete example, when there are multiple types of works A through E, the information on which work a particular user is scheduled to perform may be obtained from the DB in which the schedule is registered, or when the user inputs the work schedule through the operation panel 110, the input information may be obtained. Once the work the user is planning to perform is identified, the work DB illustrated in FIG. 2D is searched using the work as the key, and the type information corresponding to the type of consumables required for the work subjected to search and the forecast information corresponding to the forecasted consumption of consumables expected to be required for the target work are obtained from the work DB.

Then, the PC 100 calculates the remaining amount of the consumables after execution of work (S407). In S407, the PC 100 calculates the remaining amount of the consumables after execution of the work based on the estimate of the remaining amount of the consumables calculated in S205 and the estimated consumption of the consumables estimated to be necessary for the work obtained in S403. Then, the PC 100 determines whether the remaining amount calculated in S407 is enough for one day's work (S409). When it is determined that the remaining amount is enough for one day's work (S409: YES), the user mode management process shown in FIG. 6 is terminated.

On the other hand, when it is determined that the remaining amount is not enough for one day's work (S409: NO), the PC 100 displays the consumables that are in shortage (S411). Examples of the display in S411 will be described later. Next, the PC 100 determines whether there is a consumable stock with respect to the consumables in shortage (S413). In S413, the PC 100 determines whether or not there is a consumable stock based on the stock information obtained in S207.

When it is determined that there is a consumable stock (S413: YES), the PC 100 displays the stock model number (S415). An example of the display in S415 will be described later. After execution of S415, the PC 100 terminates the user mode management process shown in FIG. 6. When it is determined that there is no consumable stock (S413: NO), the user mode management process shown in FIG. 6 is terminated. When any of S409, S413 and S415 is completed, and the user mode management process shown in FIG. 6 is terminated, S303 of FIG. 5 is terminated.

On the other hand, when it is determined that the PC 100 is not in the "User Mode" (S301: NO), the PC 100 executes the administrator mode management process (S305). When S305 is executed, the administrator mode information table 513 is displayed on the management screen 501 mentioned above, as shown in FIGS. 9 and 10.

The administrator mode information table 513 includes a plurality of display fields, and the plurality of display fields are arranged in such a way that there are the same number of rows as the plurality of optional products and the same number of columns as the plurality of display items related to the optional products. FIGS. 9 and 10 show examples of the plurality of display items: the "User Name," the "Node Name," "1 week" (see FIG. 9), "1 Month" (See FIG. 9), "Remaining Amount of 1st Consumables" (see FIG. 10), "Remaining Amount of 2nd Consumables" (see FIG. 10). However, other display items may be included as well.

Figure 7:
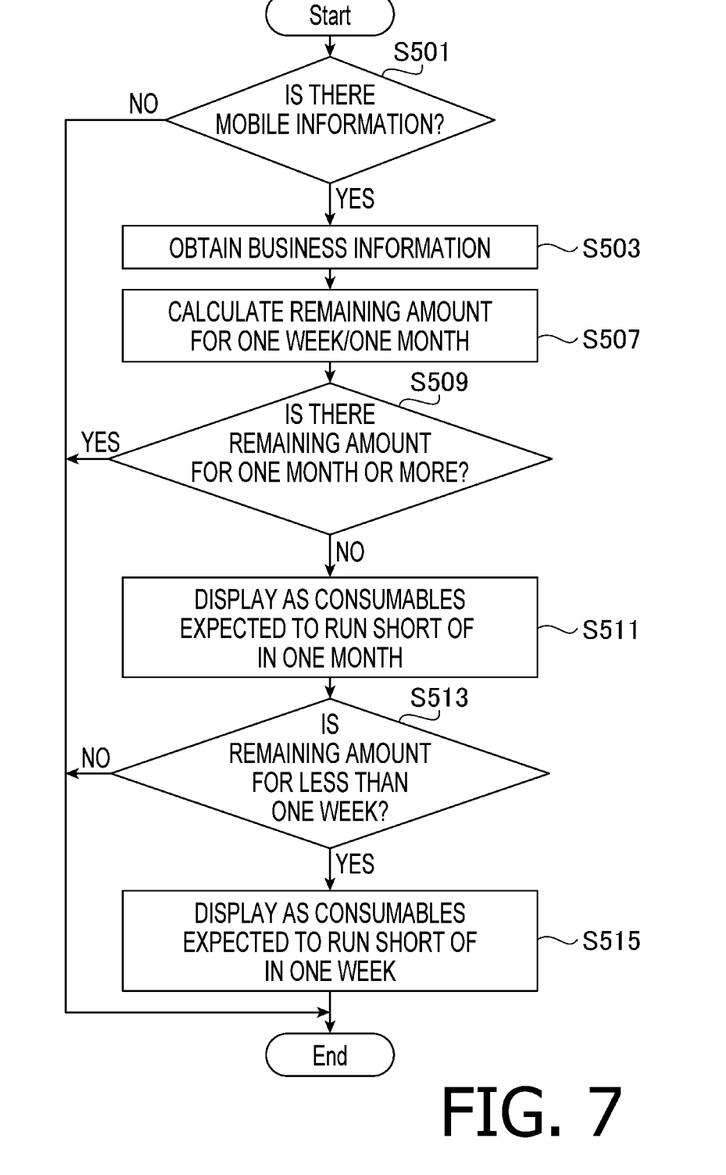
FIG. 7 shows a flowchart illustrating an administrator mode management process.

Details of the option management process (S305) are shown in FIG. 7. When the option management process is started, as shown in FIG. 7, the PC 100 determines whether or not there is mobile information (S501). In S501, the PC 100 determines whether each managed device is a mobile product by performing a process similar to S401. When it is determined that no mobile product is included in the managed devices as a result of the determining process (S501: NO), the administrator mode management process shown in FIG. 7 is terminated.

On the other hand, when the mobile product is included in the managed devices, it is determined that there is the mobile information (S501: YES). In such a case, the PC 100 obtains the work information (S503). The work information obtained in S503 includes the type information indicating the types of the consumables necessary for the work of one week and one month, and the forecast information indicating the estimated consumed amount of the consumables estimated to be necessary for the work of one week and one month. In S503, such work information is obtained from the information source. The information source is the same as used in S403.

Next, the PC 100 calculates the remaining amount of consumables after one week and one month (S507). In S507, the PC 100 calculates the remaining amount of consumables after one week and one month based on the estimated remaining amount of consumables calculated in S205 and the estimated consumption of consumables estimated to be required by the work obtained in S503. The PC 100 then determines whether the remaining amount calculated in S507 is enough for one month (S509). When it is determined that the remaining amount is enough for one month (S509: YES), the administrator mode management process shown in FIG. 7 is terminated.

When it is determined that the remaining amount is not enough for one month (S509: NO), the PC 100 displays the target consumables as those which will be in shortage in one month (S511). An example of the display in S511 will be described below. Next, the PC 100 determines whether the remaining amount of the consumables calculated in S507 is for less than one week (S513). When it is determined that the remaining amount is for less than one week (S513: YES), the PC 100 displays the target consumables as those which will be in shortage in one week (S515). Examples of the display in S515 will be described later. After completing S515, the administrator mode management process shown in FIG. 7 is terminated. When it is determined that the remaining amount is not for less than one week (i.e., the remaining amount is for equal to more than one week) (S513: NO), the administrator mode management process shown in FIG. 7 is terminated. After completing any of S509, S513 and S515, the administrator mode management process shown in FIG. 7 is terminated.

After execution of S303 or S305 of FIG. 5, the screen display updating process shown in FIG. 5 is terminated. After terminating the screen display updating process shown in FIG. 5, S113 of FIG. 3 is terminated, and the PC 100 determines whether or not the management program is to be terminated (S117). In S117, it is determined whether or not a termination instruction has been input by the user operation on the operation panel 110. When it is determined that the management program is not to be terminated (S117: NO), the process returns to S111. Accordingly, the processing steps after S111 are repeatedly executed. On the other hand, when it is determined that the management program is to be terminated (S117: YES), the management process shown in FIG. 3 is terminated.

In the management process as described above, when the management screen 501 as illustrated, for example, in FIG. 8 is displayed on the display 120, the information in the user mode information table 511 is displayed such that the information is displayed, as an initial state, in a sorted manner using "User Name" as the key. Further, when the management screen 501 as illustrated, for example, in FIGS. 9 and 10 is displayed on the display 120, the information in the administrator mode information table 513 is displayed such that the information is displayed, as an initial state, in a sorted manner using "User Name" as the key. Therefore, compared to a case where the information is displayed in an order unrelated to the user, the information corresponding to a specific user can be easily grasped without oversight. It is noted that which item is used as the key for sorting can be changed, for example, by clicking on the name of each item with the mouse.

When the "User Mode" is selected in the mode selection field 507, as illustrated in FIG. 8, a status object representing the status of the consumables is displayed in the display field of the "Remaining Amount of Consumables" field in the user mode information table 511, corresponding to the managed device. The status object may be an image object or a combination of an image object and a text object.

In the user mode information table 511, the status objects corresponding to the consumables that may become in shortage of remaining amount in one day's work are displayed. Therefore, the user can grasp the current remaining amount by looking at the display of the status object, and at the same time, the user can grasp that there is a possibility of running out of the remaining amount in one day's work based on the fact that the status object is displayed.

For example, in FIG. 8, with respect to the managed device of which "Node Name" is "PT1," a status object that can be indicated in five levels (0/4, 1/4, 2/4, 3/4, and 4/4) is displayed in the display field 521. In the example shown in FIG. 8, the status object indicating the level of 2/4 is displayed. In this case, by looking at the status object in the display field 521, the user can grasp that the current remaining amount of the rechargeable battery is about 2/4, and at the same time, based on the fact that the status object is displayed, the user can grasp that, when the remaining amount of the battery is about 2/4, there is a possibility that the remaining amount will be insufficient during one day's work. Therefore, in this case, the user can take actions such as recharging the rechargeable battery, replacing the battery with another rechargeable battery, or preparing a spare rechargeable battery so that the user can replace it on the go.

In FIG. 8, for the managed device of which "Node Name" is "MFP," the status object is not displayed in the display field 523 of the "Remaining Amount of Consumables" row. This is because the "MFP" is a stationary type of managed device. That is, according to the present embodiment, the status object is displayed in the display field of the "Remaining Amount of Consumables" row only for the mobile type managed device. Such a displaying method makes it easier to focus on the mobile type managed device when there are multiple managed devices. However, whether or not to adopt such a configuration is optional, and a status object may be displayed in the same manner for the stationary type managed devices. Further, it may be configured so that the display target can be switched between the mobile type, the stationary type, or both by user operation or setting.

Further, in FIG. 8, in the "Stock of Consumables" row of the user mode information table 511, text objects indicating spare consumables that can be attached to the managed device as alternatives for the consumables installed in the managed device is displayed in association with the managed device. It is noted such text objects are examples of spare consumable information according to the present disclosures. Accordingly, the user can look at the spare consumable information displayed on the management screen 501 to grasp alternatives to the consumables that have a problem with the remaining amount.

Next, when "Administrator Mode" is selected in the mode selection field 507, a status object representing the status of consumables that are likely to be a problem in a week is displayed in association with the managed device in the display field (e.g., display field 531.) of the "1 Week" row of the administrator mode information table 513 as illustrated in FIG. 9. In the "1 Month" field (e.g., a field 533), a status object representing the status of the consumables that are likely to be a problem in one month is displayed in association with the managed device. It is similar to the case of the user mode information table 511 in that the status object may be an image object or a combination of an image object and a text object.

The status object corresponding to a rechargeable battery that is displayed in the administrator mode information table 513 is not displayed based on the remaining amount of the battery, but based on the useful life of the rechargeable battery (which is an example of a useful life object according to the present disclosures). That is, when the rechargeable battery status object is displayed in the display field 533 of the "1 Month" row of the administrator mode information table 513, as shown in FIG. 9, it is estimated that the useful life of the rechargeable battery expires in one month. Such an estimation can be done by calculating or estimating the cumulative usage time of the rechargeable battery based on its usage history. When such a status object is displayed, the user (e.g., the administrator, etc.) can realize that a replacement for the rechargeable battery should be prepared within a month.

The management screen 501 illustrated in FIG. 10 is an example different from the management screen 501 illustrated in FIG. 9. In this example shown in FIG. 10, the status objects are displayed in the order of the consumables with the highest priority in the "Remaining Amount of 1st Consumables" row, the "Remaining Amount of 2nd Consumables" row, and so on. For example, in FIG. 8, for the managed device of which "Node Name" is "PT1," the status objects are aligned in the order of the rechargeable battery (display field 541), the paper roll (display field 543), and so on. According to the present embodiment, the priority is determined by referring to the optional product DB shown in FIG. 2B and based on the "Priority" registered in the optional product DB.

In FIG. 10, with respect to the managed device of which "Node Name" is "PT3," only the paper roll (display field 545) is displayed as the status object. In this case, unlike the managed device of which "Node Name" is "PT1," the managed device "PT3" has enough remaining amount of the battery (e.g., fully charged) or the battery is not required (e.g., used with an AC adapter).

Effects

As described above, according to PC 100 described above, the management screen 501 displayed on the display 120 displays the status objects representing the status of the consumables, in association with the managed device. Therefore, the user can grasp the consumables that have a problem with the remaining amount by looking at the status objects displayed on the management screen.

Further, according to the present embodiment, the user name of the managed device (i.e., the user object.) is displayed on the management screen 501 in association with the managed device. Therefore, the user can grasp the user of the managed device by looking at the user object displayed on the management screen 501.

Further, according to the present embodiment, the information displayed on the management screen 501 is displayed in an order with using the user as the key. Therefore, compared to a case where the information is displayed on the management screen 501 in the order unrelated to the user, the information corresponding to a particular user can be easily be grasped without oversight.

According to the present embodiment, when the managed device is a mobile type device, the status object is displayed on the management screen 501 in association with the managed device (see, for example, the display field 521 in FIG. 8). On the other hand, when the managed device is a stationary type device, the status object is not displayed (see, for example, the display field 523 in FIG. 8). Therefore, when the user wants to grasp the status of an optional item attached to the mobile type device, the information can easily be grasped because the status object corresponding to the stationary type device is not displayed.

Further, according to the present embodiment, when the useful life of the consumables expires within a particular period of time, the useful life object representing the expiration of the useful life of the consumables (see display field 533) is displayed on the management screen 501 in association with the managed device. Therefore, it is possible to grasp the consumables of which useful life is about to expire.

Further, in the present embodiment, in the "Stock of Consumables" field of the user mode information table 511, a text object indicating a spare consumable that can be attached to the managed device as a substitute for the consumable currently attached to the managed device (which is an example of spare consumable information) is displayed in association with the managed device. Therefore, the user can see the spare consumables information displayed on the management screen 501 to grasp the alternatives to the consumables that have a problem with the remaining amount.

Other Embodiments

The above description of the management program, information processing device, an information processing method is merely illustrative embodiments. That is, the present disclosures should not be limited to the above-mentioned illustrative embodiments, but can be implemented in various forms within the scope not deviating from aspects of the present disclosures.

For example, in the above embodiment, the MFP 200 and the mobile printer 210 are illustrated as examples of the managed device, but the managed device should not be limited to the MFP 200 or the mobile printer 210. As the managed device, various devices configured to allow attachment of optional items can be assumed. Examples of such a managed device include a variety of network devices, for example, printing devices such as printers, facsimile machines, and MFPs, image input devices such as scanners, network cameras, and MFPs, image communication devices such as facsimile machines and MFPs, communication devices such as smartphones, tablet terminals, cell phones, and network routers, information server devices such as network storage, cutting plotters (cutting machines) and the like. Further, the managed devices may be home appliances equipped configured to communicate via a network (so-called network home appliances) which include, for example, sewing machines, VCRs, HDD/DVD recorders, home game machines, radios, washing machines, clothes dryers, microwave ovens, ovens, refrigerators, rice cookers, electric pots, dishwashers, dryers, air conditioners, heaters, dehumidifiers, humidifiers, air purifiers, lighting devices, toilet seats for washing, etc.

In the above embodiment, the DB 400 is a data storage area accessible via the communication network 300, but a part of or all of the storage area equivalent to the DB 400 may be configured as a storage area provided in the PC 100. In such a case, the PC 100 can access the storage area equivalent to the DB 400 not via (i.e., directly) the communication network 300. When the storage area equivalent to the DB 400 is provided in the PC 100, if a file server function is implemented to the PC 100, a device external to the PC 100 (e.g., the MFP 200 and the mobile printer 210) can access the storage area in the PC 100 via the communication network 300.

A plurality of functions realized by one component illustrated in the above embodiment may be realized by a plurality of components. A single function realized by one component illustrated in the above embodiment may be realized by multiple components. A plurality of functions realized by a plurality of components illustrated in the above embodiments may be realized by a single component. A single function realized by the plurality of components illustrated in the above embodiment may be realized by a single component. Some of the components illustrated in the above embodiments may be omitted. At least a part of the configuration illustrated in one of the above embodiments may be added to or replaced with the configuration illustrated in the above embodiments other than that one embodiment.

Supplemental Modifications

As is apparent from the illustrative embodiments described above, the management program, information processing device, an information processing method according to the present disclosures may further include following configurations.

(A) In the displaying process, the management screen may be configured to display a user object representing a user of the managed device in association with the managed device. By having the processor of the information processing device execute the management process using the management program configured in this way, the management screen displayed on the display displays the user objects representing users of the managed devices in association with the managed devices. Therefore, the user can grasp the users of the managed devices by looking at the user object displayed on the management screen.

(B) In the display process, the information displayed in the management screen may be configured to be displayed in an order using the user represented by the user object as a key. By having the processor of the information processing device execute the management process using the management program configured in this way, the information displayed on the management screen is displayed in the order of the user as the key. Therefore, compared to a case where the information displayed on the management screen is displayed in an order unrelated to the user, the information corresponding to a specific user can easily be grasped without oversight.

(C) In the displaying process, the management screen may be configured such that a status object is displayed in association with the managed device when the managed device is a mobile type managed device, and the status object is not displayed when the managed device is a stationary type managed device.

By having the processor of the information processing device execute the management process using the management program configured in this way, when the managed device is a mobile type managed device, a status object is displayed in association with the managed device. On the other hand, when the device to be managed is a stationary type managed device, the status object will not be displayed. Therefore, if the user wishes to grasp the status of the consumables attached to a mobile type managed device, the information can easily be grasped only to the extent that the status object corresponding to the stationary type managed device is not displayed.

(D) The processor may be configured to perform an estimating process to estimate when the useful life of the consumables will expire, based on the usage history of the consumables. In the displaying process, the management screen may be configured to display a useful life object representing the expiration of the useful life of the consumables, corresponding to the managed device, when the useful life of the consumables estimated by the estimating process expires within a particular period.

By having the processor of the information processing device execute the management process using the management program configured in this way, the useful life object is displayed in association with the managed device. Therefore, it is possible to grasp the consumables of which useful life is expired.

(E) In the displaying process, the management screen may be configured to display the spare consumable information that indicates the spare consumables that can be attached to the managed device as alternatives for the consumables attached to the managed device, corresponding to the managed device.

By having the processor of the information processing device execute the management process using the management program configured in this way, the management screen displayed on the display will show the spare consumable information that indicates spare consumables that can be attached to the managed device as alternatives for the consumables attached to the managed device in association with the managed device. In this way, the user can see the consumables on the management screen. Therefore, by looking at the spare consumable information displayed on the management screen, the user can grasp the alternatives to the consumables that have problems with remaining capacity.

(F) An information processing device of the present disclosures may have configurations corresponding to any or all of the features (A) to (E) above. In an information processing method according to the present disclosures may have configuration corresponding to any or all of the features (A) to (E) above.

What is claimed is:

1. A non-transitory computer-readable recording medium for an information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device, the recording medium containing computer-executable instructions which cause, when executed by the processor, the information processing device to perform managing the consumables, the managing including:

obtaining remaining amount information indicating a remaining amount of the consumables from the at least one managed device through the communication device;

obtaining work information indicating a type of work using the at least one managed device from an information source in which the work information is registered, the work information including forecast information indicating an estimated consumed amount of the consumables required for the type of work indicated by the work information in a particular period;

determining whether a remaining amount of the consumables becomes less than a particular determination criteria value within the particular period based on the remaining amount information and the work information; and displaying a management screen on the display, the management screen being a screen displaying a status object indicating a status of the consumables, of which the remaining amount is determined to become lower than the particular determination criteria value in the determining, in association with the at least one managed device.

2. The non-transitory computer-readable recording medium according to claim 1, wherein, in the displaying of the management screen, a user object indicating a user of the at least one managed device is displayed, on the management screen, in association with the at least one managed device, respectively.

3. The non-transitory computer-readable recording medium according to claim 2, wherein, in the displaying of the management screen, a plurality of pieces of information to be displayed on the management screen are displayed in an order using the user represented by the user object as a key.

4. The non-transitory computer-readable recording medium according to claim 1, wherein, in the displaying of the management screen:
when the at least one managed device is a mobile type managed device, the status object is displayed on the management screen in association with the at least one managed device; and
when the at least one managed device is a stationary type managed device, the status object is not displayed on the management screen.

5. The non-transitory computer-readable recording medium according to claim 1, wherein the instructions further cause, when executed by the processor, the processor to perform estimating an expiration term of useful life of the consumables based on a usage history of the consumable, wherein, in the displaying of the management screen, when the expiration term of the consumables estimated in the estimating is expected to be within the particular period, a useful life object indicating an expiration of the useful life of the consumable is displayed on the management screen in association with the at least one managed device.

6. The non-transitory computer-readable recording medium according to claim 1, wherein, in the displaying of the management screen, spare consumable information indicating spare consumables which can be installed in the at least one managed device as substitutes for the consumables currently attached to the at least one managed device is displayed on the management screen in association with the at least one managed device.

7. An information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device,
    wherein the information processing device is configured to perform managing the consumables, the managing including:
        obtaining remaining amount information indicating a remaining amount of the consumables from the at least one managed device through the communication device;
        obtaining work information indicating a type of work using the at least one managed device from an information source in which the work information is registered, the work information including forecast information indicating an estimated consumed amount of the consumables required for the type of work indicated by the work information in a particular period;
        determining whether a remaining amount of the consumables becomes less than a particular determination criteria value within the particular period based on the remaining amount information and the work information; and
        displaying a management screen on the display, the management screen being a screen displaying a status object indicating a status of the consumables, of which the remaining amount is determined to become lower than the particular determination criteria value in the determining, in association with the at least one managed device.

8. The information processing device according to claim 7,
    wherein, in the displaying of the management screen, a user object indicating a user of the at least one managed device is displayed, on the management screen, in association with the at least one managed device, respectively.

9. The information processing device according to claim 8,
    wherein, in the displaying of the management screen, a plurality of pieces of information to be displayed on the management screen are displayed in an order using the user represented by the user object as a key.

10. The information processing device according to claim 7,
    wherein, in the displaying of the management screen:
        when the at least one managed device is a mobile type managed device, the status object is displayed on the management screen in association with the at least one managed device; and
        when the at least one managed device is a stationary type managed device, the status object is not displayed on the management screen.

11. The information processing device according to claim 7,
    wherein the instructions further cause, when executed by the processor, the processor to perform estimating an expiration term of useful life of the consumables based on a usage history of the consumable,
    wherein, in the displaying of the management screen, when the expiration term of the consumables estimated in the estimating is expected to be within the particular period, a useful life object indicating an expiration of the useful life of the consumable is displayed on the management screen in association with the at least one managed device.

12. The information processing device according to claim 7,
    wherein, in the displaying of the management screen, spare consumable information indicating spare consumables which can be installed in the at least one managed device as substitutes for the consumables currently attached to the at least one managed device is displayed on the management screen in association with the at least one managed device.

13. An information processing method of controlling an information processing device included in an information processing system, the information processing system further including at least one managed device, the information processing device being provided with a processor, a display, and a communication device, the at least one managed device being configured such that at least one type of consumables is attached thereto, the information processing device being configured to communicate with the at least one managed device through the communication device, the information processing method including managing the consumables, the managing including:
    obtaining remaining amount information indicating a remaining amount of the consumables from the at least one managed device through the communication device;
    obtaining work information indicating a type of work using the at least one managed device from an information source in which the work information is registered, the work information including forecast information indicating an estimated consumed amount of the consumables required for the type of work indicated by the work information in a particular period;
    determining whether a remaining amount of the consumables becomes less than a particular determination criteria value within the particular period based on the remaining amount information and the work information; and
    displaying a management screen on the display, the management screen being a screen displaying a status object indicating a status of the consumables, of which the remaining amount is determined to become lower than the particular determination criteria value, in association with the at least one managed device.

14. The information processing method according to claim 13,
    wherein, in the displaying of the management screen, a user object indicating a user of the at least one managed device is displayed, on the management screen, in association with the at least one managed device, respectively.

15. The information processing method according to claim 14,
    wherein, in the displaying of the management screen, a plurality of pieces of information to be displayed on the management screen are displayed in an order using the user represented by the user object as a key.

16. The information processing method according to claim 13,
    wherein, in the displaying of the management screen:
        when the at least one managed device is a mobile type managed device, the status object is displayed on the management screen in association with the at least one managed device; and
        when the at least one managed device is a stationary type managed device, the status object is not displayed on the management screen.

17. The information processing method according to claim 13,
> wherein the instructions further cause, when executed by the processor, the processor to perform estimating an expiration term of useful life of the consumables based on a usage history of the consumable,
> wherein, in the displaying of the management screen, when the expiration term of the consumables estimated in the estimating is expected to be within the particular period, a useful life object indicating an expiration of the useful life of the consumable is displayed on the management screen in association with the at least one managed device.

18. The information processing method according to claim 13,
> wherein, in the displaying of the management screen, spare consumable information indicating spare consumables which can be installed in the at least one managed device as substitutes for the consumables currently attached to the at least one managed device is displayed on the management screen in association with the at least one managed device.

* * * * *